(12) United States Patent
Patil et al.

(10) Patent No.: US 12,438,541 B2
(45) Date of Patent: Oct. 7, 2025

(54) LOW VOLTAGE CAN TRANSCEIVER (71) Applicant: TEXAS INSTRUMENTS INCORPORATED, Dallas, TX (US)

(72) Inventors: Amit Patil, Hubli (IN); Deep Banerjee, Bangalore (IN); Lokesh Kumar Gupta, Bangalore (IN); Viswanathan Venkatesh Kumar, Bangaluru (IN); Upasana Bhattacharya, Bangalore (IN); Pallabi Pramanik, Singur (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 18/344,990

(22) Filed: Jun. 30, 2023

(65) Prior Publication Data

US 2025/0007513 A1  Jan. 2, 2025

(51) Int. Cl.
*H03K 17/687* (2006.01)
*H04L 12/40* (2006.01)

(52) U.S. Cl.
CPC ... *H03K 17/6871* (2013.01); *H04L 12/40032* (2013.01); *H04L 2012/40215* (2013.01); *H04L 2012/40273* (2013.01)

(58) Field of Classification Search
CPC .......... H03K 17/6871; H04L 12/40032; H04L 2012/40215; H04L 2012/40273

USPC .................................................. 327/520, 574
See application file for complete search history.

(56) References Cited

U.S. PATENT DOCUMENTS

| | | | |
|---|---|---|---|
| 6,324,044 B1* | 11/2001 | Teggatz | G06F 13/385 361/119 |
| 7,242,227 B2* | 7/2007 | Pauletti | H04L 25/0284 327/170 |
| 2004/0043739 A1* | 3/2004 | Jordanger | H04B 3/30 455/302 |
| 2016/0094362 A1* | 3/2016 | Brennan | H04L 12/40039 327/109 |
| 2020/0264643 A1* | 8/2020 | Banerjee | G05F 1/56 |
| 2021/0167989 A1* | 6/2021 | Broughton | H04L 12/40013 |
| 2024/0178875 A1* | 5/2024 | van Dijk | H04L 12/40 |
| 2024/0187533 A1* | 6/2024 | Chou | H04M 19/026 |

* cited by examiner

*Primary Examiner* — William Hernandez
(74) *Attorney, Agent, or Firm* — Mandy Barsilai Fernandez; Frank D. Cimino (57) ABSTRACT

In an example, a CAN transceiver includes a first transistor having a control terminal, having a drain coupled to a voltage supply terminal, and having a source. The CAN transceiver includes a second transistor having a drain coupled to a control terminal of the first transistor, a source coupled to the source of the first transistor, and a control terminal. The CAN transceiver includes a bias circuit coupled to the control terminal of the second transistor, the second transistor configured to convert the first transistor to a diode configuration responsive to detecting high voltage noise.

20 Claims, 7 Drawing Sheets

LOW VOLTAGE CAN TRANSCEIVER

BACKGROUND

Controller area network (CAN) is a serial bus communication standard developed for automotive communication, and also used in other applications. CAN allows microcontrollers and other devices to communicate without a host computer. A 2-line differential CAN bus connects various electronic control units (ECUs). A CAN transceiver is a chip that includes the driver and receiver. The CAN transceiver interfaces the CAN bus to a CAN controller, which communicates with an ECU.

SUMMARY

In at least one example of the description, a circuit includes a first transistor having a drain, a control terminal, and a source coupled to a voltage supply terminal. The circuit includes a second transistor having a source, a control terminal, and a drain coupled to a drain of the first transistor. The circuit also includes a third transistor having a control terminal, having a drain coupled to a control terminal of the second transistor, and having a source coupled to a source of the second transistor. The circuit includes a fourth transistor having a control terminal and a source coupled to a source of the second transistor.

In at least one example of the description, a CAN transceiver includes a first transistor having a control terminal, a drain, and a source. The CAN transceiver includes a second transistor having a control terminal, a source, and a drain coupled to the drain of the first transistor. The CAN transceiver includes a third transistor having a control terminal, a source coupled to a voltage terminal, and a drain coupled to the source of the second transistor. The CAN transceiver also includes a fourth transistor having a drain, a control terminal, and a source coupled to the source of the second transistor.

In at least one example of the description, a circuit includes a CAN transceiver. The CAN transceiver includes a first transistor having a control terminal, having a drain coupled to a voltage supply terminal, and having a source. The CAN transceiver includes a second transistor having a drain coupled to a control terminal of the first transistor, a source coupled to the source of the first transistor, and a control terminal. The CAN transceiver includes a bias circuit coupled to the control terminal of the second transistor, the second transistor configured to convert the first transistor to a diode configuration responsive to detecting high voltage noise.

BRIEF DESCRIPTION OF THE DRAWINGS

The same reference numbers or other reference designators are used in the drawings to designate the same or similar (functionally and/or structurally) features.

DETAILED DESCRIPTION

Existing automotive CAN transceivers are designed to operate off of a 5 volt (V) supply. Many microcontrollers and other electronic devices operate on a 3.3 V supply to reduce power consumption. An extra low dropout (LDO) voltage regulator provides the 5 V supply. These extra LDO regulators may be needed in each ECU in an automobile to power the CAN transceiver. Some existing CAN transceivers may operate on a 3.3 V supply, but those transceivers are unable to meet electromagnetic compatibility (EMC) standards for automotive applications. EMC standards specify the acceptable limit of electromagnetic interference (EMI) in any electrical or electronic system. EMC standards ensure that a device's operation does not disturb the communication system around it or the devices adjacent to it. For proper operation, the 3.3 V CAN transceiver can handle a 60 V differential on the CAN bus, a max voltage of ±60 V on each of the CAN bus lines, and have immunity to high frequency (1 MHz to 1 GHz) and high voltage (±40 V) common mode noise, which may be referred to as direct power injection (DPI).

In examples herein, a 3.3 V CAN transceiver includes circuitry that protects the transceiver if a high voltage appears on the CAN bus. In one example, a transistor in the transceiver operates as a switch in normal operation and changes into a blocking diode (e.g., a diode configuration) when the CAN bus voltage exceeds a threshold. In another example, high frequency and high voltage noise may create a reverse current flowing in the CAN transceiver. To counter this reverse current, a current flowing in the opposite direction in the CAN transceiver is increased. The additional circuitry that performs the actions in the examples herein may be low voltage and high speed, and does not interfere with the operation of the CAN transceiver. The circuitry can also operate with a 3.3 V supply. With the examples herein, a 3.3 V CAN transceiver can meet the requirements for automotive applications.

Figure 1:
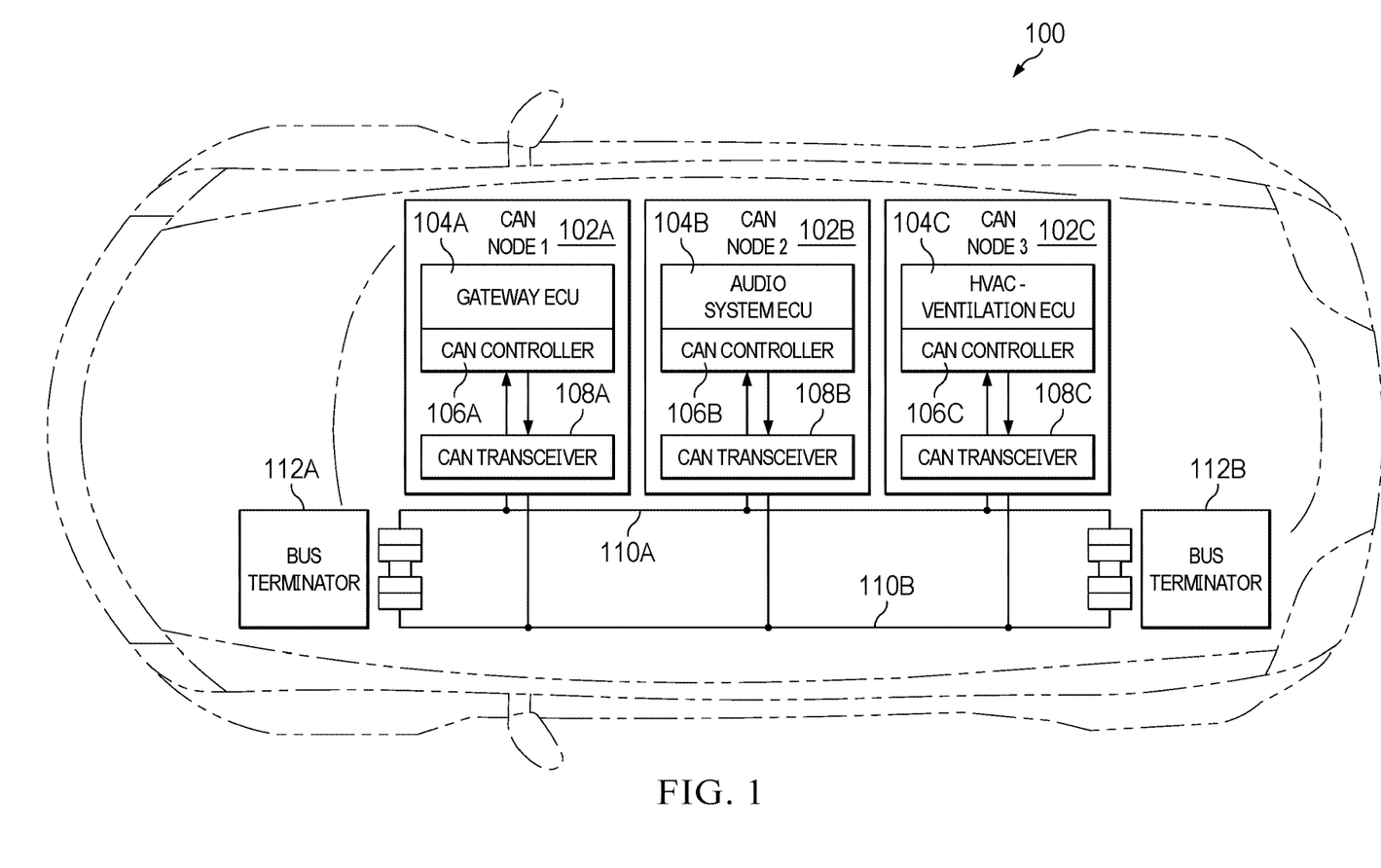
FIG. 1 illustrates an example block diagram of a CAN architecture in an automobile.

FIG. 1 illustrates an example block diagram of a CAN architecture 100 in an automobile. CAN architecture 100 includes one or more CAN nodes 102. In this example, three CAN nodes 102A, 102B, and 102C are shown. Each CAN node 102 includes an ECU 104, a CAN controller 106, and a CAN transceiver 108. CAN architecture 100 also includes first conductor 110A, second conductor 110B, and bus terminators 112A and 112B. An ECU is an embedded system in automotive electronics that controls one or more of the electrical systems or subsystems in the vehicle. Some ECUs in a vehicle may include an engine control module (ECM), powertrain control module (PCM), transmission control module (TCM), brake control module (BCM), body control module (BCM), and suspension control module (SCM).

CAN node 102A includes ECU 104A (a gateway ECU in this example), CAN controller 106A, and CAN transceiver 108A. A gateway ECU may be a central electronic control module for vehicle data management. The gateway ECU may function as an interface between various networks in a vehicle. CAN node 102B includes ECU 104B (an audio system ECU in this example), CAN controller 106B, and CAN transceiver 108B. The audio system ECU may manage audio systems in a vehicle. CAN node 102C includes ECU 104C (a heating, ventilation, air conditioning (HVAC)-Ventilation ECU in this example), CAN controller 106C, and CAN transceiver 108C. The HVAC-Ventilation ECU may control HVAC systems in a vehicle. Some systems may include dozens of CAN nodes 102 that each have a CAN controller 106 and CAN transceiver 108, but only three are shown here for simplicity. The ECUs use the CAN bus to communicate with other ECUs, devices, and controllers in a vehicle. A CAN controller acts as an interface between an application and the CAN bus. The CAN controller is a microcontroller in one example. The function of the CAN controller is to convert the data provided by the application into a CAN message frame fit to be transmitted across the bus. The CAN controller handles the data link layer of CAN communication, whereas the CAN transceiver handles the physical layer.

Each CAN transceiver 108 is physically coupled to a differential CAN bus (e.g., for providing a differential output and receiving a differential input) that includes a first conductor 110A and a second conductor 110B (collectively, conductors 110). The two conductors 110, e.g., a twisted pair cable, are the signal lines of the CAN bus. The CAN bus has bus terminators 112A and 112B coupled to the conductors 110, as shown. Bus terminators 112A and 112B may be dedicated 120 Ohm resistors in an example, and they absorb the CAN signal energy, to prevent the signals from being reflected from the bus ends. The first conductor 110A is referred to as a CANH 110A (CAN-high), and the second conductor 110B is referred to as a CANL 110B (CAN-low). The CAN transceivers 108 drive (transmit) data to and detect (receive) data from the CAN bus, for examples within CAN messages. In an example, a CAN transceiver 108 converts a single-ended logic signal used by a CAN controller 106 to a differential signal transmitted over the CAN bus. The CAN transceiver 108 also determines a bus logic state from a differential signal (e.g., voltage) on the CAN bus, rejects the common-mode noise, and outputs a corresponding single-ended logic signal to the CAN controller 106.

The CAN bus has two example logic states, dominant and recessive. A recessive bit occurs or can be detected responsive to the CANH 110A voltage being within 0.5 V of the CANL 110B voltage. A dominant bit occurs or can be detected responsive to the CANH 110A voltage being more than 0.9 V higher than the CANL 110B voltage. In some examples, the dominant bit creates about a 2 V differential between CANH 110A and CANL 110B. As described below, with a 3.3 V supply, a 2 V differential on the CAN bus leaves about 1.3 V of headroom to operate additional circuitry in the CAN transceiver 108. In examples herein, each CAN transceiver 108 includes the circuitry described herein to change the transistor in the transceiver from functioning as a switch to functioning as a blocking diode responsive to the CAN bus voltage differential exceeding a threshold. Each CAN transceiver 108 also includes circuitry to increase current to counter a reverse current flowing in the CAN transceiver 108, for example responsive to high frequency and high voltage noise.

Figure 2:
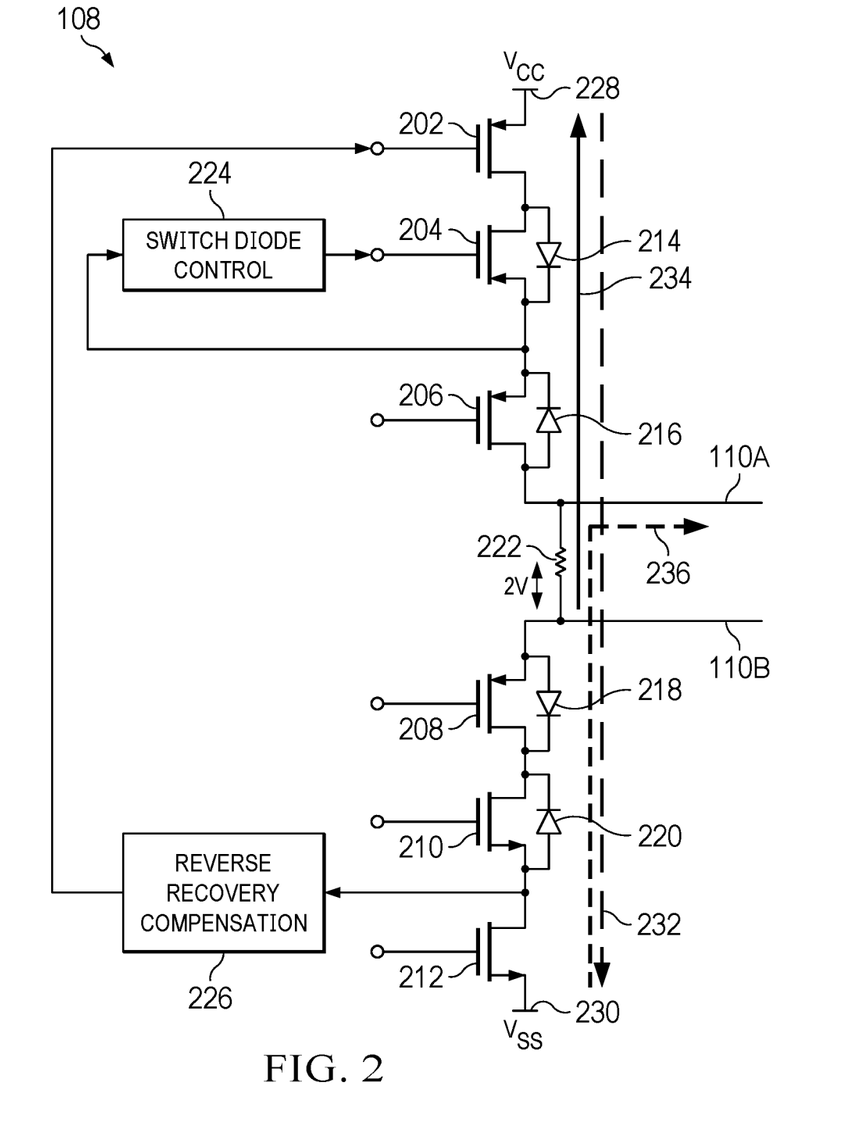
FIG. 2 illustrates an example circuit for a CAN transceiver.

FIG. 2 illustrates an example circuit for a CAN transceiver 108. CAN transceiver 108 includes six transistors 202, 204, 206, 208, 210, and 212. Also illustrated is a source body diode 214 of transistor 204, a source body diode 216 of transistor 206, diode 218, and a source body diode 220 of transistor 212. CAN transceiver 108 includes a resistive element 222 between CANH 110A and CANL 110B. CAN transceiver 108 also includes switch diode control circuitry 224 and reverse recovery compensation circuitry 226. CAN transceiver 108 includes voltage terminal 228 (e.g., a voltage supply terminal) and voltage terminal 230. FIG. 2 also shows example currents 232, 234, and 236 when operating CAN transceiver 108.

Transistors 202, 204, 206, 208, 210, and 212 provide the functions of the CAN transceiver 108 for driving data to and receiving data from the CAN bus. A controller, such as CAN controller 106, produces data signals for transmission on the CAN bus by controlling the gates of transistors 202, 204, 206, 208, 210, and 212. CAN transceiver 108 is coupled to CANH 110A and CANL 110B. A resistive element 222 is shown between CANH 110A and CANL 110B, and represents a differential load (e.g., the bus terminator 112A or 112B) on the CAN bus.

A voltage $V_{CC}$ is provided at voltage terminal 228. $V_{CC}$ is 3.3 V, in one example. A voltage $V_{SS}$ is provided at voltage terminal 230. $V_{SS}$ is electrical ground, in one example.

In CAN transceiver 108, transistors 202, 204, 206, 208, 210, and 212 are field effect transistors (FETS). However, other types of transistors may be used in other examples. As shown, transistors 202, 204, 206, and 208 are p-channel FETS, and transistors 210 and 212 are n-channel FETS. Transistor 202 has a source coupled to voltage terminal 228, a gate or control terminal coupled to reverse recovery compensation circuitry 226, and a drain coupled to transistor 204. Transistor 204 has a drain coupled to the drain of transistor 202, a gate or control terminal coupled to switch diode control circuitry 224, and a source coupled to transistor 206. Transistor 206 has a source coupled to the source of transistor 204 and to switch diode control circuitry 224, a gate or control terminal coupled to CAN controller 106, and a drain coupled to CANH 110A.

Transistor 208 has a source coupled to CANL 110B, a gate or control terminal coupled to CAN controller 106, and a drain coupled to transistor 210. Transistor 210 has a drain coupled to the drain of transistor 208, a gate or control terminal coupled to CAN controller 106, and a source coupled to transistor 212. Transistor 212 has a drain coupled to the source of transistor 210, a gate or control terminal coupled to CAN controller 106, and a source coupled to voltage terminal 230.

During operation of CAN transceiver 108, current 232 is a desired current path responsive to the CAN transceiver 108 working properly. Current 232 flows from voltage terminal 228, through transistors 202, 204, and 206, through resistive element 222, and through transistors 208, 210, and 212 to voltage terminal 230. Currents 234 and 236 are undesired currents, in this example.

Current 234 may enter CAN transceiver 108 at CANL 110B and flow up to the supply voltage at voltage terminal 228. Thus, current 234 may interfere with the voltage on the CAN bus created by current 232. In examples herein, current 234 is blocked by operating transistor 204 as a blocking diode using the switch diode control circuit 224.

Current 236 is a reverse current that may flow from voltage terminal 230 to CANH 110A. Thus, current 236 may also interfere with the voltage on the CAN bus created by current 232. As described herein, the reverse recovery compensation circuit 226 senses current 236 flowing through transistor 210, e.g., at the source of transistor 210. Responsive thereto, current 232 is increased to compensate for the undesired current 236. Increasing current 232 in this scenario facilitates the proper operation of CAN transceiver 108.

In a CAN transceiver, such as CAN transceiver 108, relatively large voltages, such as plus or minus 60 V, could appear on the CAN bus, which may result in the undesired current 234. If this occurs, the CAN transceiver 108 includes switch diode control circuitry 224 to block reverse current 234 from reaching voltage terminal 228. In some CAN transceivers that operate using 5 V, a diode is included to block current 234. However, a CAN transceiver such as example CAN transceiver 108 that operates using 3.3 V, lacks sufficient available operating voltage to include this blocking diode. Therefore, in examples herein, switch diode control circuitry 224 selectively operates transistor 204 as a diode having a reverse polarity as the body diode 214 under some conditions.

For example, in normal operation of CAN transceiver 108, transistor 204 operates as a high voltage transistor. Namely, the gate of transistor 204 is pulled to ground (described below with respect to FIG. 3), and transistor 204 operates as a switch. In the presence of a high voltage on the CAN bus, transistor 204 operates as a diode responsive to switch diode control circuitry 224, in which the gate is shorted to the source of transistor 204. The transition between operating transistor 204 as a switch and as a diode occurs quickly and at a precise voltage. Also, the circuitry in switch diode control circuitry 224 does not create a reverse path for current to reach voltage terminal 228.

In another example, DPI may create a large voltage on the CAN bus, such as 40 V. During normal operation, transistor 208 is forward biased and conducting current, such as 100 milliamps (mA). If the DPI voltage goes negative, transistor 208 stops conducting current, as the negative DPI voltage reverse biases transistor 208. However, transistor 208 does not stop conducting current immediately upon being reverse biased, due to the device properties (e.g., the reverse recovery behavior of the diode 218). Responsive to the DPI, transistor 208 may conduct current in the opposite direction for a short time (e.g., current from voltage terminal 230 to CANH 110A). The current conducted by transistor 208 in the opposite direction is current 236. If current 236 is conducted during this short time, the voltage differential on the CAN bus may collapse, which interferes with the proper operation of the CAN transceiver 108. However, during the time that the unwanted current 236 is conducting through transistor 208, the voltage at the drain of transistor 212 is negative. In examples herein, to prevent the voltage differential on the CAN bus from collapsing, reverse recovery compensation circuitry 226 senses this negative voltage at the drain of transistor 212, and responds by increasing the current through the P-side driver of CAN transceiver 108 (e.g., through transistors 202, 204, and 206). Therefore, reverse recovery compensation circuitry 226 increases the size of current 232 to offset the undesired current 236 in this scenario. The operation of an example reverse recovery compensation circuitry 226 is described below.

Figure 3:
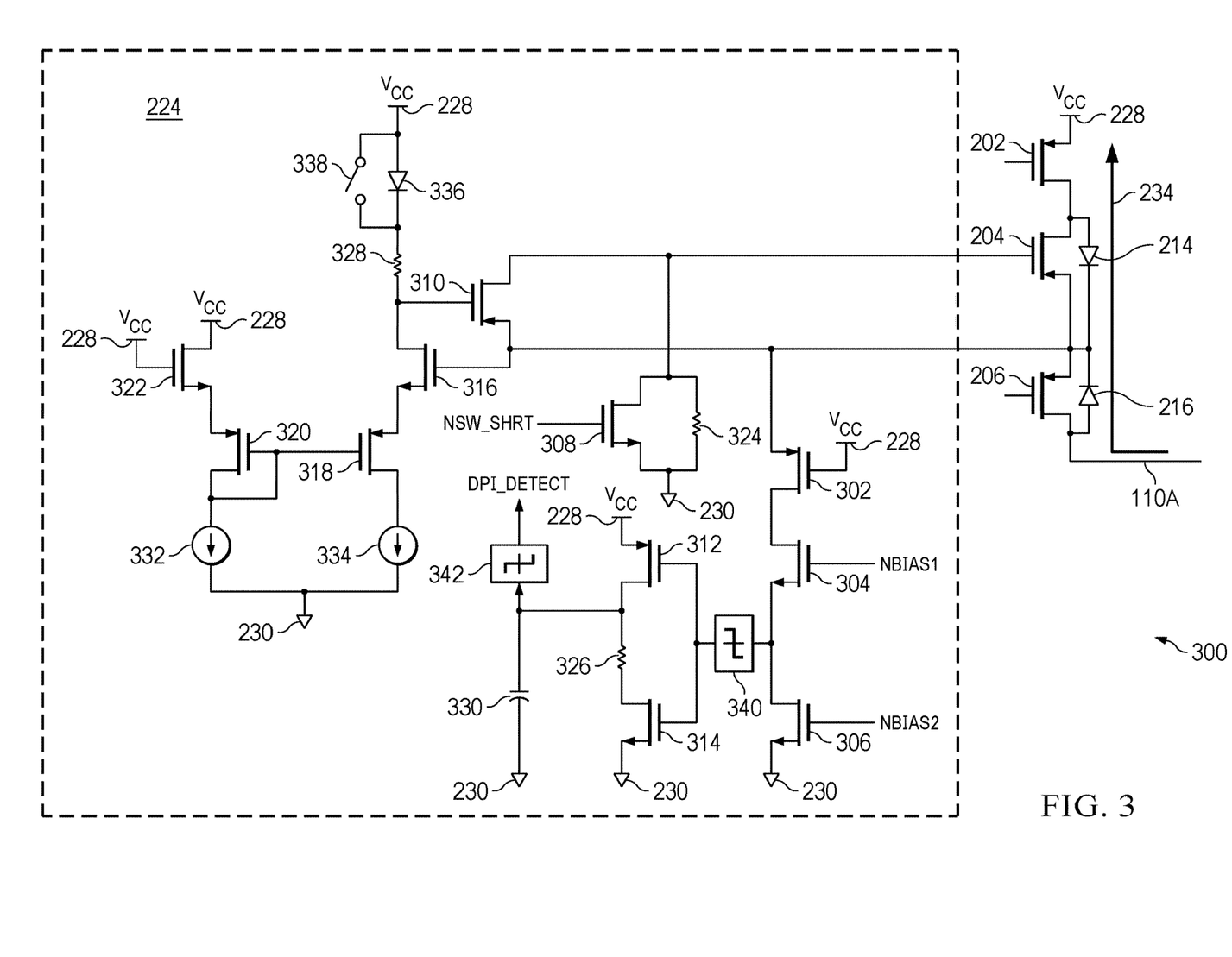
FIG. 3 illustrates an example circuit that includes switch diode control circuitry.

FIG. 3 illustrates an example circuit 300 that includes switch diode control circuitry. Circuit 300 includes a portion of CAN transceiver 108 (transistors 202, 204, and 206) and an example of switch diode control circuitry 224. Circuit 300 also shows current 234 flowing through transistors 202, 204, and 206. As described herein, switch diode control circuitry 224 operates transistor 204 as a diode in the presence of a high voltage detected on CANH 118A.

Switch diode control circuitry 224 includes transistors 302, 304, 306, 308, 310, 312, 314, 316, 318, 320, and 322. Switch diode control circuitry 224 also includes resistors 324, 326, and 328. Switch diode control circuitry 224 includes capacitor 330 and current sources 332 and 334. Switch diode control circuitry 224 includes diode 336 and switch 338. Switch diode control circuitry 224 includes Schmitt triggers 340 and 342.

In switch diode control circuitry 224, transistor 302 has a source coupled to the sources of transistors 204 and 206, a gate coupled to voltage terminal 228, and a drain coupled to a drain of transistor 304. Transistor 304 has a gate that receives a signal NBIAS1 and a source coupled to transistor 306 and Schmitt trigger 340. Transistor 306 has a drain coupled to transistor 304 and Schmitt trigger 340, a gate that receives a signal NBIAS2, and a source coupled to voltage terminal 230. Transistor 308 has a drain coupled to the gate of transistor 204, a gate that receives a signal NSW_SHRT, and a source coupled to voltage terminal 230. Resistor 324 is coupled to the source and drain of transistor 308.

Transistor 310 has a drain coupled to the gate of transistor 204, a source coupled to the sources of transistors 204 and 206, and a gate coupled to transistor 316 and resistor 328. Transistor 312 has a source coupled to voltage terminal 230, a gate coupled to a gate of transistor 314 and to Schmitt trigger 340, and a drain coupled to resistor 326, Schmitt trigger 342, and capacitor 330. Transistor 314 has a drain coupled to resistor 326, a gate coupled to a gate of transistor 312 and to Schmitt trigger 340, and a source coupled to voltage terminal 230. Resistor 326 is coupled between transistors 312 and 314, and capacitor 330 has a first terminal coupled to resistor 326 and Schmitt trigger 342, and a second terminal coupled to voltage terminal 230.

Transistor 316 has a drain coupled to a gate of transistor 310 and resistor 326, a gate coupled to the source of transistor 310, and a source coupled to transistor 318. Transistor 318 has a source coupled to transistor 316, a drain coupled to current source 334, and a gate coupled to a gate of transistor 320. Transistor 320 has a source coupled to transistor 322, a gate coupled to the gate of transistor 318 and to the drain of transistor 320, and a drain coupled to current source 332. Transistor 322 has a source coupled to a source of transistor 320, a gate coupled to voltage terminal 228, and a drain coupled to voltage terminal 228.

Resistor 328 has a first terminal coupled to a gate of transistor 310 and a drain of transistor 316. Resistor 328 has a second terminal coupled to diode 336 and to switch 338. Diode 336 is also coupled to voltage terminal 228. Switch 338 is coupled across diode 336. Resistor 328 limits the current. The gate of transistor 310 is biased to $V_{CC}$ (voltage terminal 228) during normal operation. If a high voltage is applied at the gate, blocking diode 336 is activated.

In operation, switch diode control circuitry 224 quickly and precisely switches the operation of transistor 204 from a switch to a diode. The switch-diode conversion of transistor 204 is achieved by adding transistor 310 across the source and gate of transistor 204. In the normal mode of operation, transistor 310 is off, and the source to gate voltage of transistor 204 is greater than zero. If transistor 310 is turned on, the source to gate voltage of transistor 204 becomes approximately zero, which converts transistor 204 to diode operation. If the voltage on CANH 110A goes high, the voltage at the source of transistor 310 goes high. The source of transistor 310 is coupled to the gate of transistor 316, and therefore the voltage at the gate of transistor 316 goes high as well. Transistor 316 operates as a common-source amplifier, and the voltage at the drain of transistor 316 is pulled down responsive to CANH 110A going high. The drain of transistor 316 is coupled to the gate of transistor 310, so the voltage at the gate of transistor 310 goes down as well. This produces a high source to gate voltage across transistor 310. Transistor 316 receives the high voltage information on CANH 110A, and provides this high voltage information to the gate of transistor 310. Transistor 316 may be a low voltage device operating in a high voltage domain, so it has a quick response. Therefore, transistor 310 turns on if the voltage at CANH 110A is high. Transistor 310 then shorts the gate and source of transistor 204, and transitions transistor 204 to diode operation to block current 234 from flowing from CANH 110A to voltage terminal 228.

Transistors 318, 320, and 322, along with current sources 332 and 334, ensure that the voltage at the source of transistor 316 is close to $V_{CC}$. Transistors 318 and 320 operate as a voltage mirror that biases the source of transistor 316. Transistor 318 provides source-follower based biasing for the source of transistor 316 to set a precise switch/diode conversion threshold. This portion of switch diode control circuitry 224 ensures the switch to diode conversion of transistor 204 happens at a precise voltage, and is largely independent of process and temperature.

Resistor 328, diode 336, and switch 338 form a bias circuit that biases the gate of transistor 310 to the voltage $V_{CC}$ in normal operation, but allow transistor 310 to activate the blocking diode of transistor 204 if the voltage at CANH 110A goes high.

In the operations described above, high voltages are sensed with low voltage devices to ensure high speed operation. The source-follower based biasing allows a precise threshold to be set to switch transistor 204 from a switch to a diode.

During normal operation, transistor 308 and resistor 324 hold the gate of transistor 204 to ground to prevent a gate charge buildup during transitions in the circuit. During a DPI condition (e.g., high voltage on the CAN bus), transistor 308 is disabled (via the NSW_SHRT signal) based on the DPI_DETECT signal. Transistor 308 is disabled during DPI so transistor 204 can transition to diode operation. The circuitry in switch diode control circuitry 224 that produces DPI_DETECT senses a high voltage on the CAN bus and ensures that transistor 308 is turned off.

Transistors 302, 304, and 306 provide DPI detection in this example (e.g., they operate as a high voltage detection circuit). The source of transistor 302 is coupled to the sources of transistors 204 and 206. Therefore, a high voltage on CANH 110A produces a high voltage at the source of transistor 302. A current flows through transistors 302, 304, and 306 in this condition. If the voltage on CANH 110A rises above a threshold, Schmitt trigger 340 asserts. Transistors 312 and 314, resistor 326, and capacitor 330 provide an asymmetric delay for the signal from Schmitt trigger 340 to reach Schmitt trigger 342. This ensures that the DPI_DETECT signal is quickly asserted after the voltage on CANH 110A goes high, but some delay occurs after the voltage on CANH 110A drops back down. In one example, resistor 326 and capacitor 330 (e.g., a delay circuit) are selected to provide a delay of approximately two microseconds before Schmitt trigger 342 deasserts. Other delay circuits, delay circuitry, or sizes of delay may be used in other examples. Therefore, if the voltage on the CAN bus goes high, DPI_DETECT is immediately asserted. If the voltage on the CAN bus goes low, the DPI_DETECT signal is not deasserted for two microseconds. DPI is sinusoidal noise, so it is high for half of a cycle and low for the other half of the cycle. To avoid a false deassertion of the DPI_DETECT signal during the low half cycle, DPI_DETECT asserts when the high voltage occurs, but does not deassert immediately even though the DPI goes negative. This prevents transistor 204 from inadvertently changing from diode operation to switch operation during a negative half-cycle of DPI.

Figure 4:
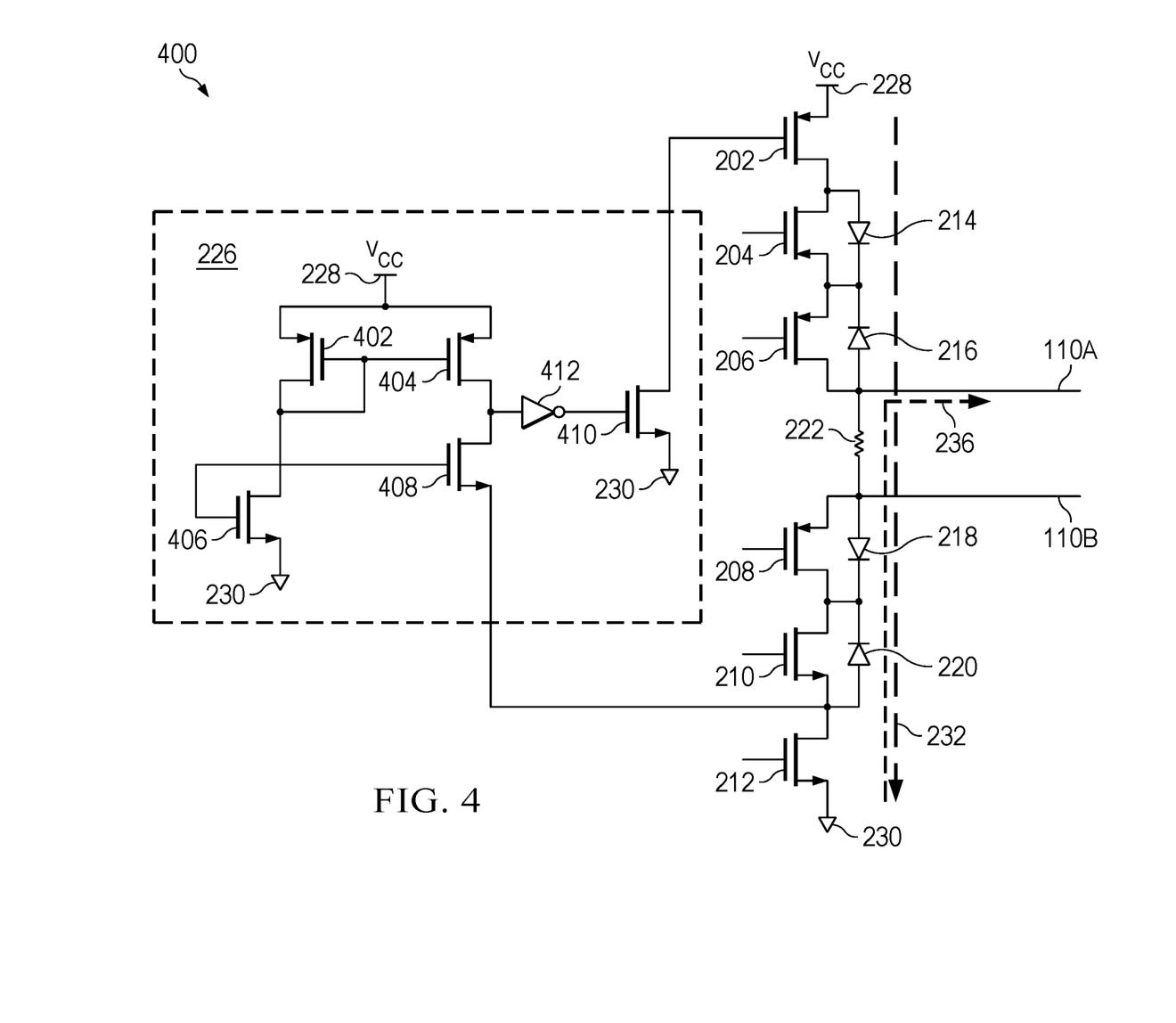
FIG. 4 illustrates an example circuit that includes reverse recovery compensation circuitry.

FIG. 4 illustrates an example circuit 400 for reverse recovery compensation. Circuit 400 includes CAN transceiver 108 (transistors 202, 204, 206, 208, 210, and 212) and an example reverse recovery compensation circuitry 226. Reverse recovery compensation circuitry 226 includes transistors 402, 404, 406, 408, and 410. Reverse recovery compensation circuitry 226 also includes inverter 412.

In reverse recovery compensation circuitry 226, transistor 402 has a source coupled to voltage terminal 228, a drain coupled to transistor 406, and a gate coupled to the gate of transistor 404 and to the drain of transistor 402. Transistor 404 has a source coupled to voltage terminal 228, a source coupled to an input of inverter 412 and to transistor 408, and a gate coupled to the gate of transistor 402. Transistor 406 has a drain coupled to the drain of transistor 402, a source coupled to voltage terminal 230, and a gate coupled to the gate of transistor 408. Transistor 408 has a drain coupled to transistor 404 and to the input of inverter 412, a source coupled to the source of transistor 210, and a gate coupled to the gate of transistor 406. Transistor 410 has a drain coupled to the gate of transistor 202, a source coupled to voltage terminal 230, and a gate coupled to the output of inverter 412.

As described herein, reverse recovery compensation circuitry 226 senses a negative voltage at the drain of transistor 212 during DPI, and in response increases the strength of the P-side driver of CAN transceiver 108 (e.g., transistors 202, 204, and 206). Therefore, reverse recovery compensation circuitry 226 increases the size of current 232 to offset the undesired current 236 in this scenario.

In circuit 400, with a high voltage (e.g., +40 V) on the CAN bus, current flows from CANL 110B to voltage terminal 230, which is an expected operation. If the CAN bus voltage goes negative (e.g., −40 V) after this due to DPI, transistor 208 goes into reverse recovery mode. Then, reverse current 236 flows from voltage terminal 230 to CANH 110A, and the voltage across the CAN bus can collapse responsive to this scenario. Also, during this reverse conduction scenario, the voltage at the drain of transistor 212 goes negative. Reverse recovery compensation circuitry 226 detects the negative voltage at the drain of transistor 212. Responsive to detecting the negative voltage here, the current 232 is increased. Current 232 is increased by pulling down the gate voltage of transistor 202.

In operation, transistors 402 and 404 operate as a current mirror. A negative voltage at the drain of transistor 212 turns on transistor 408. The voltage at the input of inverter 412 is pulled down. Inverter 412 outputs a high voltage at its output, which is provided to the gate of transistor 410. The high voltage at the output of inverter 412 turns on transistor 410. Transistor 410 pulls down the voltage at the gate of transistor 202, which increases current 232. Therefore, if a negative voltage occurs at the drain of transistor 212, current 232 is increased to prevent the voltage across the CAN bus from collapsing.

In one example, transistor 202 may be a first transistor, transistor 204 may be a second transistor, transistor 310 may be a third transistor, and transistor 206 may be a fourth transistor. Transistor 316 may be a fifth transistor, transistor 308 may be a sixth transistor, transistor 302 may be a seventh transistor, and transistor 304 may be an eighth transistor.

In another example, transistor 208 may be a first transistor, transistor 210 may be a second transistor, transistor 212 may be a third transistor, and transistor 408 may be a fourth transistor. Transistor 410 may be a fifth transistor, and transistor 202 may be a sixth transistor.

In another example, transistor 204 is a first transistor and transistor 310 is a second transistor. Transistor 308 is a third transistor, and transistor 316 is a fourth transistor.

Figure 5:
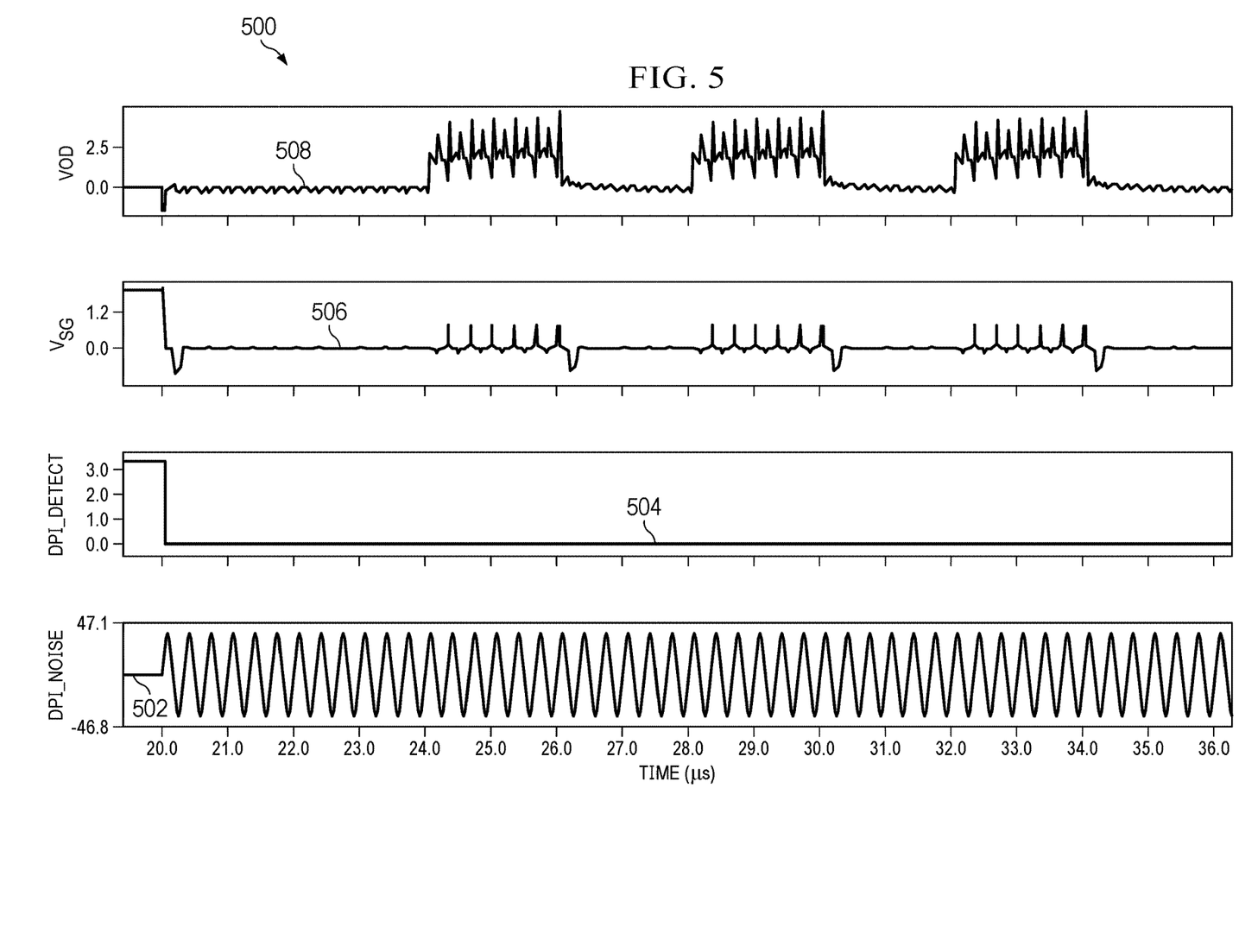
FIG. 5 illustrates an example collection of waveforms for a CAN transceiver.

FIG. 5 is a collection of waveforms 500 for a CAN transceiver in accordance with various examples herein. Waveforms 500 show an example of DPI detection with the circuitry described herein. FIG. 5 includes waveforms 502, 504, 506, and 508. In FIG. 5, the x-axis denotes time in microseconds, and the various y-axes denote voltage in volts.

Waveform 502 is the DPI noise (DPI_NOISE) on a CAN bus in an example. The DPI noise in this example is represented by a high frequency sine wave with an amplitude of ±40 V. Waveform 504 is the inverse of the DPI detection signal ($\overline{DPI\_DETECT}$) provided by Schmitt trigger 342. The DPI detection signal is at approximately 3 V when asserted, and 0 V when deasserted. Waveform 504 shows the inverse of the DPI detection signal.

Waveform 506 is the source to gate voltage ($V_{SG}$) of transistor 204. In normal (switch mode) operation, transistor 204 may have a source to gate voltage of approximately 1.5 V. In the diode operation, the source and gate of transistor 204 are coupled together via transistor 310, and the source to gate voltage is approximately zero. Waveform 508 is the differential voltage on the CAN bus (VOD). Waveform 508 is the voltage difference between CANH 110A and CANL 110B.

In an example operation, DPI noise (waveform 502) begins at approximately 20 microseconds. The DPI noise is a high frequency, high voltage sine wave. As the DPI noise begins, the DPI detection circuit described herein detects the DPI and asserts the DPI_DETECT signal. Waveform 504 shows that the DPI_DETECT signal (from Schmitt trigger 342) is asserted quickly after DPI noise begins.

Responsive to the assertion of the DPI_DETECT signal, switch diode control circuitry 224 quickly and precisely switches the operation of transistor 204 from a switch to a diode. As shown in waveform 506, the source to gate voltage $V_{SG}$ of transistor 204 drops to approximately 0 V shortly after DPI noise begins. Waveform 506 shows that transistor 204 remains in the diode state (e.g., $V_{SG}$ at approximately 0 V) during the presence of the DPI noise.

Waveform 508 is the differential voltage on the CAN bus (VOD). During DPI noise in this example, the voltage VOD on the CAN bus does not collapse but remains above 0 V. Therefore, as described above, current 232 is increased responsive to the detection of DPI to prevent the voltage across the CAN bus from collapsing due to the reverse current through transistor 208.

Figure 6:
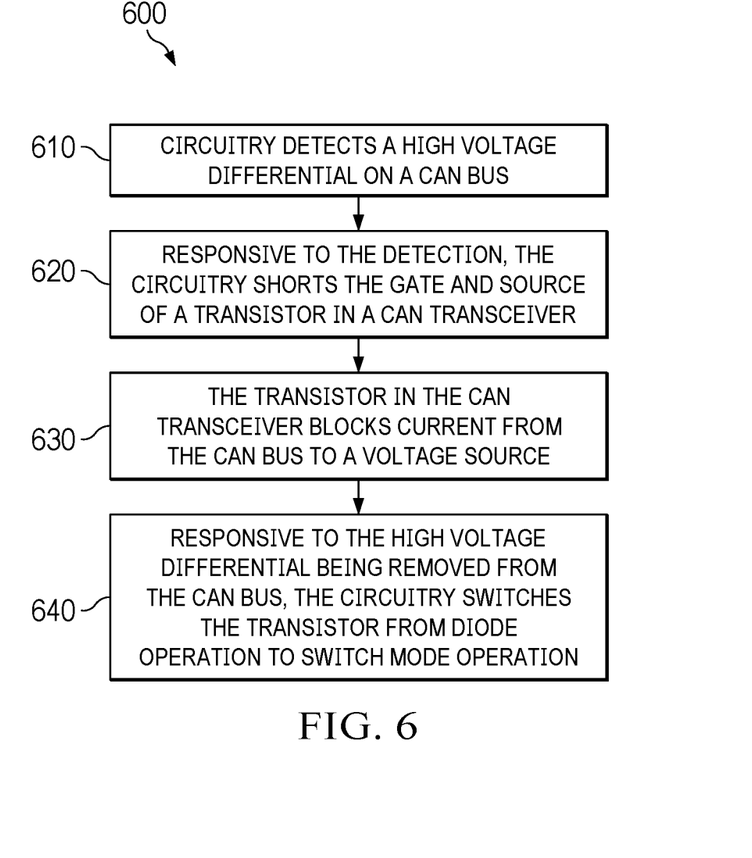
FIG. 6 illustrates an example flow diagram of a method for blocking a high voltage on a CAN bus.

FIG. 6 is a flow diagram of a method 600 for blocking a high voltage on the CAN bus in accordance with various examples herein. The steps of method 600 may be performed in any suitable order. The hardware components described above with respect to FIGS. 1 to 4 may perform method 600 in some examples. Any suitable hardware, software, or digital logic may perform method 600 in some examples.

Method 600 begins at 610, where circuitry detects a high voltage differential on a CAN bus. In one example, transistor 310 detects the high voltage differential.

Method 600 continues at 620, where circuitry shorts the gate and source of a transistor in a CAN transceiver. Shorting the gate and source of the transistor, such as transistor 204, changes the operation of the transistor to a diode operation. In one example, the gate and source of transistor 204 are shorted by turning on another transistor, such as transistor 310.

Method 600 continues at 630, where the transistor in the CAN transceiver blocks current from the CAN bus to a voltage source. In one example, transistor 204 blocks current from flowing from CANH 110A to voltage terminal 228.

Method 600 continues at 640, where, responsive to the high voltage differential being removed from the CAN bus, the circuitry switches the transistor from diode operation to switch mode operation. In one example, if the high voltage differential is no longer detected, transistor 310 turns off, and transistor 204 reverts to operating as a switch instead of a diode. The gate and source of transistor 204 are no longer shorted responsive to transistor 310 turning off.

Figure 7:
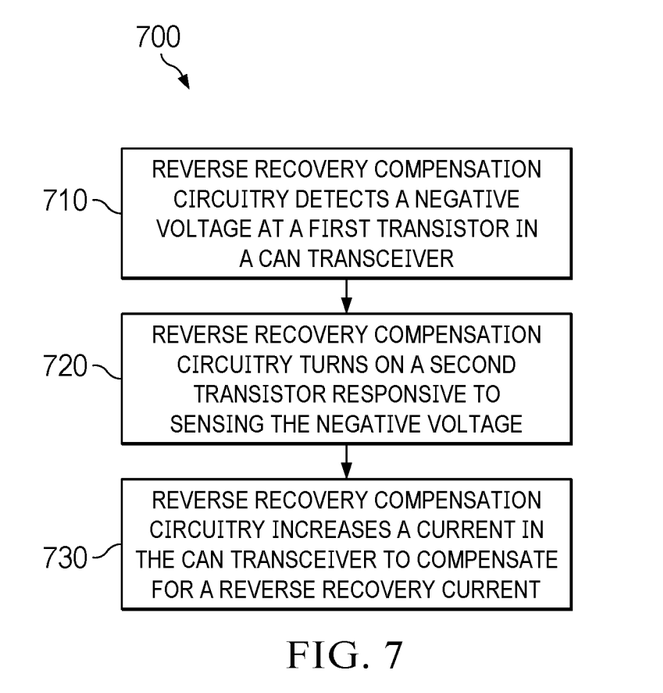
FIG. 7 illustrates an example flow diagram of a method for providing a reverse recovery compensation current in a CAN transceiver.

FIG. 7 is a flow diagram of a method 700 for providing a reverse recovery compensation current in accordance with various examples herein. The steps of method 700 may be performed in any suitable order. The hardware components described above with respect to FIGS. 1 to 4 may perform method 700 in some examples. Any suitable hardware, software, or digital logic may perform method 700 in some examples.

Method 700 begins at 710, where reverse recovery compensation circuitry 226 detects a negative voltage at a first transistor in a CAN transceiver. As an example, reverse recovery compensation circuitry 226 senses a negative voltage at the drain of transistor 212 during DPI.

Method 700 continues at 720, where reverse recovery compensation circuitry 226 turns on a second transistor responsive to sensing the negative voltage. In one example, transistor 408 turns on responsive to sensing the negative voltage at the drain of transistor 212.

Method 700 continues at 730, where reverse recovery compensation circuitry 226 increases a current in the CAN transceiver to compensate for a reverse recovery current. In one example, a gate of transistor 202 is pulled down to a lower voltage to increase the current provided by transistor 202 in the CAN transceiver. This increased current compensates for the reverse recovery current through transistor 210, and prevents a voltage across the CAN bus from collapsing as described above.

In the examples described herein, a 3.3 V CAN transceiver includes circuitry that protects the transceiver if a high voltage appears on the CAN bus. In one example, transistor 204 in CAN transceiver 108 operates as a switch in normal operation and changes into a blocking diode when the CAN bus voltage exceeds a threshold. In another example, high frequency and high voltage noise may create a reverse current 236 flowing in CAN transceiver 108. To counter this reverse current, a current flowing in the opposite direction in CAN transceiver 108 (e.g., current 232) is increased. The additional circuitry that performs the actions in the examples herein is low voltage and high speed, and does not interfere with the operation of CAN transceiver 108. The circuitry can operate with a 3.3 V supply. With the examples herein, a 3.3 V CAN transceiver can meet the standards for automotive applications.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While the use of particular transistors are described herein, other transistors (or equivalent devices) may be used instead with little or no change to the remaining circuitry. For example, a metal-oxide-silicon field-effect transistor ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs). In general, herein, a transistor has a control input/control terminal (e.g., a gate, base) and two additional terminals (e.g., source/drain, collector/emitter).

Uses of the term "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A circuit, comprising:
   a first transistor having a drain, a control terminal, and a source coupled to a voltage supply terminal;
   a second transistor having a source, a control terminal, and a drain coupled to the drain of the first transistor;
   a third transistor having a control terminal, having a drain coupled to the control terminal of the second transistor, and having a source coupled to a the source of the second transistor; and
   a fourth transistor having a control terminal and a source coupled to the source of the second transistor, wherein the third transistor is configured to inactivate the second transistor when a voltage at a drain of the fourth transistor is above a threshold.

2. The circuit of claim 1, further comprising:
   a fifth transistor having a source, a drain coupled to the control terminal of the third transistor, and a control terminal coupled to the source of the third transistor and to the source of the second transistor.

3. The circuit of claim 2, further comprising:
   a current mirror coupled to the source of the fifth transistor.

4. The circuit of claim 2, further comprising:
   a sixth transistor having a control terminal, a drain coupled to the control terminal of the second transistor, and a source coupled to a ground terminal, wherein the sixth transistor is configured to be inactivated when the drain of the fourth transistor is above the threshold.

5. The circuit of claim 4, wherein the drain of the fourth transistor is adapted to be coupled to a CAN (controller area network) bus and the threshold is a voltage on the CAN bus above which the CAN bus drives a current from the drain to the source of the fourth transistor.

6. The circuit of claim 5, further comprising:
   a seventh transistor having a control terminal, a drain, and a source coupled to the source of the second transistor; and
   an eighth transistor having a control terminal, a drain coupled to the drain of the seventh transistor, and a source coupled to a Schmitt trigger, wherein the seventh and the eight transistors are activated and provide a first signal to the Schmitt trigger when the drain of the fourth transistor is above the threshold.

7. The circuit of claim 6, further comprising:
   a delay circuit coupled to the Schmitt trigger, and the Schmitt trigger is configured to generate a second signal on receiving the first signal, and the delay circuit is configured to delay the second signal.

8. The circuit of claim 7, wherein the Schmitt trigger is a first Schmitt trigger, and the circuit further comprises:
   a second Schmitt trigger coupled to the delay circuit and to the sixth transistor, wherein the second Schmitt trigger is configured to inactivate the sixth transistor on receiving the delayed second signal from the delay circuit.

9. A controller area network (CAN) transceiver, comprising:
   a first transistor having a control terminal, a drain, and a source;
   a second transistor having a control terminal, a source, and a drain coupled to the drain of the first transistor;

a third transistor having a control terminal, a source coupled to a voltage terminal, and a drain coupled to the source of the second transistor;

a primary transistor having a drain, a control terminal, and a source coupled to a voltage supply terminal; and a compensation circuit coupled to the source of the second transistor and to the control terminal of the primary transistor.

10. The CAN transceiver of claim 9, wherein the compensation circuit is configured to activate the primary transistor when a voltage at the source of the first transistor drives a current from the source to the drain of the third transistor.

11. The CAN transceiver of claim 10, wherein the compensation circuit further comprising:

a fourth transistor having a drain, a control terminal and a source coupled to the source of the second transistor;

an inverter having an input coupled to the drain of the fourth transistor; and a fifth transistor having a source, a control terminal coupled to an output of the inverter, and a drain coupled to the control terminal of the primary transistor.

12. The CAN transceiver of claim 11, wherein the compensation circuit further comprising:

a current mirror coupled to the drain of the fourth transistor.

13. A circuit, comprising:

a controller area network (CAN) transceiver, the CAN transceiver including:

a first transistor having a drain, a control terminal, and a source coupled to a voltage supply terminal;

a second transistor having a source, a control terminal, and a drain coupled to the drain of the first transistor;

a third transistor having a control terminal, a drain, and a source coupled to the source of the second transistor; and a control circuit coupled to the source of the third transistor and to the control terminal of the second transistor, the control circuit configured to convert the second transistor to a diode configuration when a current is driven from the drain to the source of the third transistor.

14. The circuit of claim 13, wherein the control circuit further including: a fourth transistor having a drain coupled to the control terminal of the second transistor, a source coupled to the source of the second transistor, and a control terminal; and a bias circuit coupled to the control terminal of the fourth transistor, the bias circuit including a switch and a diode coupled to the control terminal of the fourth transistor.

15. The circuit of claim 13, wherein the control circuit further including a direct power injection (DPI) detection circuitry, the DPI detection circuitry configured to generate a DPI signal when a voltage at a source of the second transistor is above a threshold.

16. The circuit of claim 15, wherein the control circuit further including a fifth transistor having a drain coupled to the control terminal of the second transistor, a source coupled to a voltage terminal, and a control terminal coupled to the DPI detection circuitry, the fifth transistor configured to be inactivated when the source of the second transistor is above the threshold.

17. The circuit of claim 16, further comprising:

a sixth transistor having a control terminal, a drain, and a source coupled to a secondary voltage terminal; and a compensation circuit coupled to the drain of the sixth transistor and to the control terminal of the first transistor.

18. The circuit of claim 17, wherein the compensation circuit increases current from the first transistor to the sixth transistor when the compensation circuit detects a current from the source to the drain of the sixth transistor.

19. The circuit of claim 18, wherein the compensation circuit further comprising a seventh transistor having a drain, a control terminal and a source coupled to the drain of the sixth transistor.

20. The circuit of claim 19, wherein the compensation circuit further comprising: an inverter having an input coupled to the drain of the seventh transistor; and an eighth transistor having a source, a control terminal coupled to an output of the inverter, and a drain coupled to the control terminal of the first transistor.

* * * * *